April 28, 1970

O. E. MOYER 3,509,313

MACHINE FOR WELDING SLEEVES TOGETHER

Filed May 7, 1968

INVENTOR
OSCAR E. MOYER

BY
Brown, Critchlow, Flick & Peckham
ATTORNEYS.

April 28, 1970  O. E. MOYER  3,509,313
MACHINE FOR WELDING SLEEVES TOGETHER
Filed May 7, 1968  3 Sheets-Sheet 2

INVENTOR
OSCAR E. MOYER
BY
Brown, Critchlow, Flick & Peckham
ATTORNEYS.

April 28, 1970 O. E. MOYER 3,509,313
MACHINE FOR WELDING SLEEVES TOGETHER
Filed May 7, 1968 3 Sheets-Sheet 3

INVENTOR
OSCAR E. MOYER

BY
Brown, Critchlow, Flick & Peckham
ATTORNEYS.

United States Patent Office 3,509,313
Patented Apr. 28, 1970

3,509,313
MACHINE FOR WELDING SLEEVES TOGETHER
Oscar E. Moyer, Zelienople, Pa., assignor to Universal Manufacturing Corporation, Zelienople, Pa., a corporation of Pennsylvania
Filed May 7, 1968, Ser. No. 727,188
Int. Cl. B23k 9/12
U.S. Cl. 219—124
10 Claims

ABSTRACT OF THE DISCLOSURE

An endless conveyor chain extends around vertical front and rear sprockets and carries brackets, to each of which a pair of laterally spaced pins are secured at their rear ends so that as the pins travel up around the rear sprocket they can receive a pair of metal sleeves and carry them forward between guide members mounted above the upper length of the chain. The guide members hold the two sleeves together so that they can be welded together side by side before they fall off the pins traveling down around the front sprocket.

---

Conventional steel scaffolding is constructed from prefabricated end panels that are connected together by braces having downwardly extending pins welded to their ends. These pins are inserted in vertical sockets formed by metal sleeves welded to the legs of the panels. The sleeves are arranged in pairs for receiving the pins on braces extending in opposite directions from the panel legs. It is the general practice to weld a pair of sleeves side by side to form a double socket before they are welded to the leg. In the past, this preliminary joining of the sleeves has been done by an operator placing a pair in a jig and then welding them together. This has naturally been a rather slow process and therefore expensive.

It is among the objects of this invention to provide a machine for welding metal sleeves together side by side in pairs, which is entirely automatic, which is very rapid in operation, which greatly reduces the cost of welding the sleeves together, and which will feed welding wire to the welding station only when there are two sleeves there to be welded together.

Figure 1:
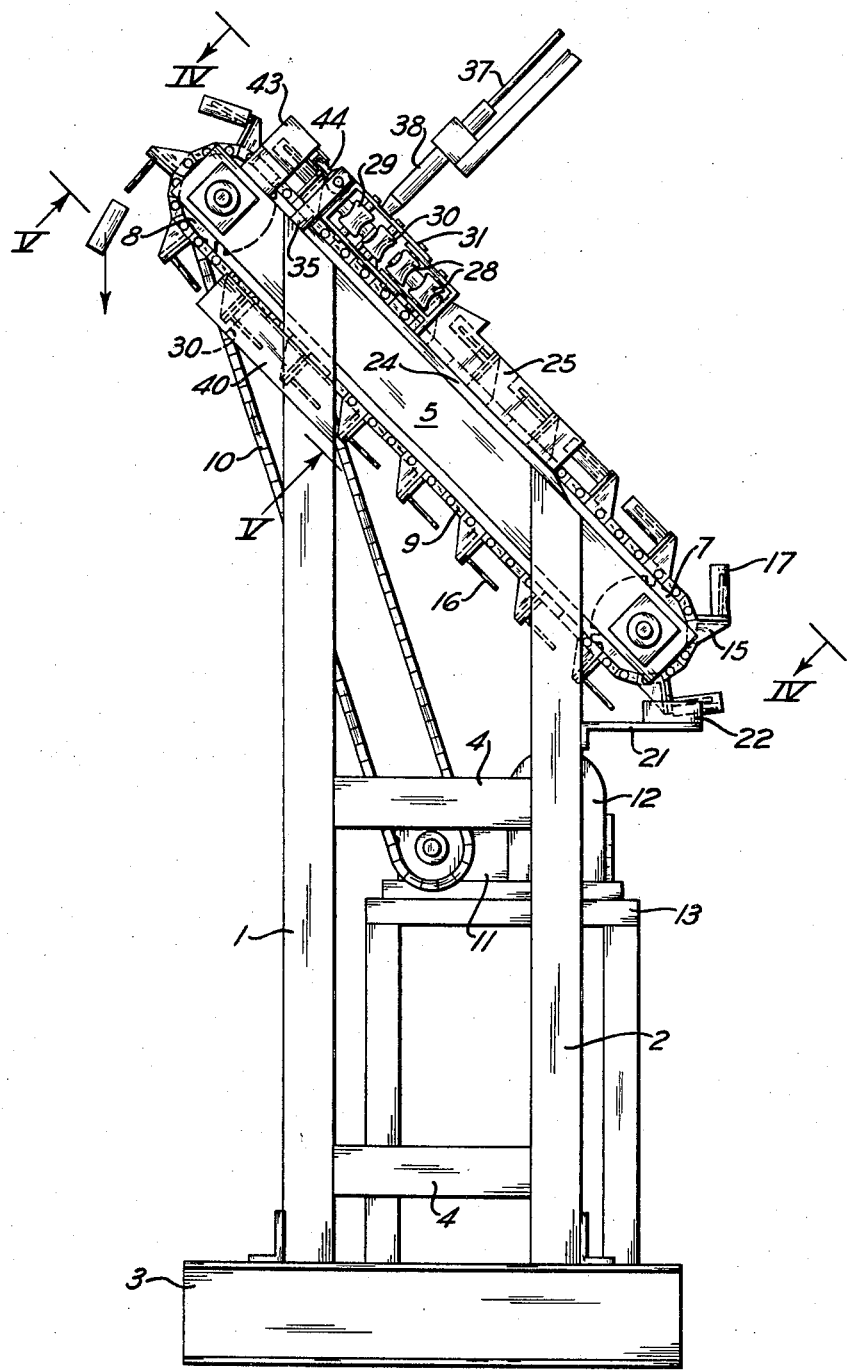
Figure 3:
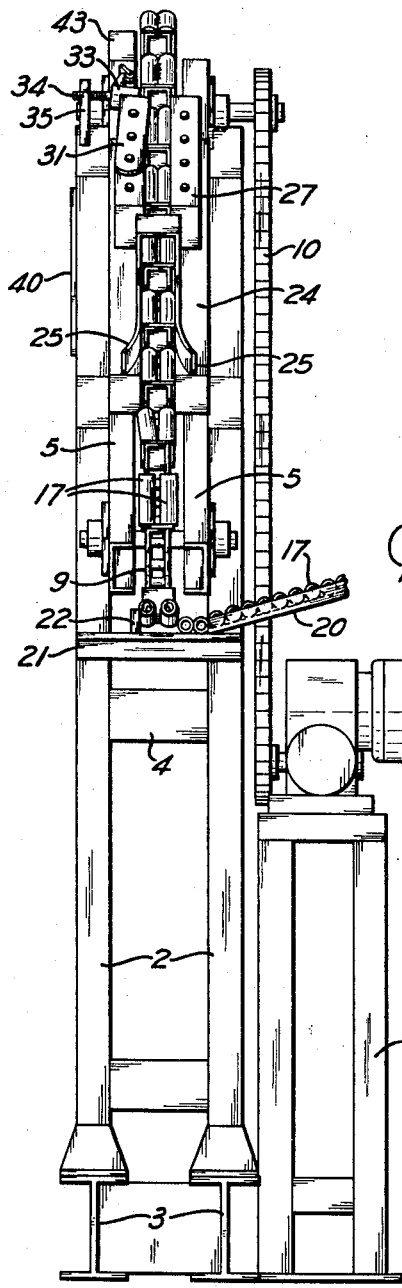
Figure 2:
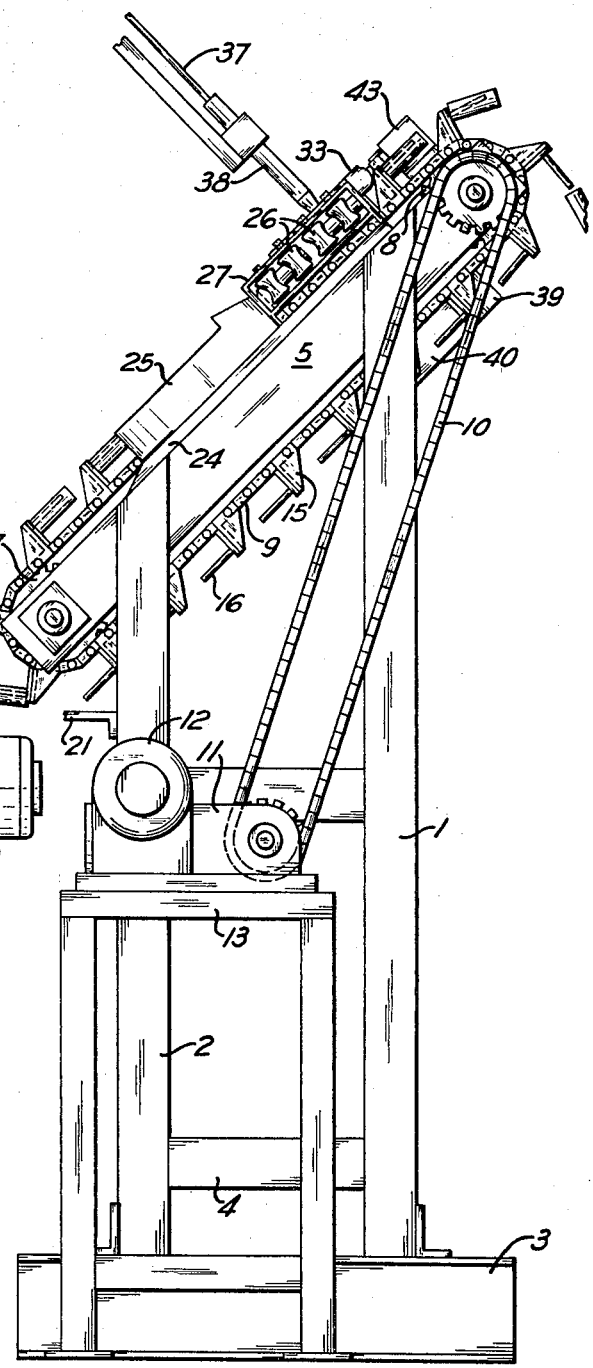
Figure 4:
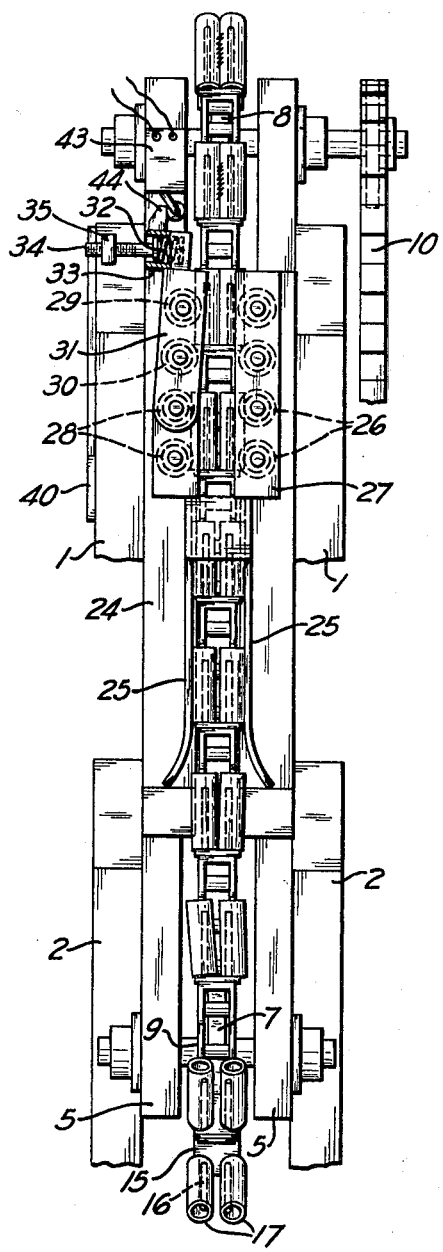
Figure 5:
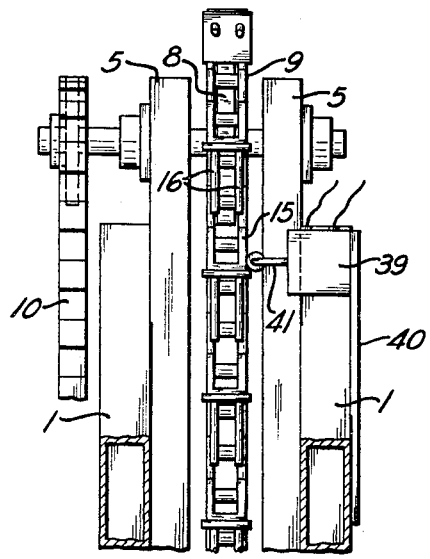

The preferred embodiment of the invention is illustrated in the accompanying drawings, in which FIG. 1 is a view of one side of the machine;
FIG. 2 is a view of the opposite side;
FIG. 3 is a rear view;
FIG. 4 is an enlarged fragmentary plan view taken on the line IV—IV of FIG. 1; and
FIG. 5 is an enlarged fragmentary bottom view taken on the line V—V of FIG. 1.

Referring to FIGS. 1 to 3 of the drawings, the frame of the machine can be built up in any desired way, the one illustrated being constructed from front and rear legs 1 and 2 mounted on short I-beams 3 and provided with suitable horizontal bracing 4. Two parallel channels 5 extend from front to back of the machine between the upper ends of the legs, to which the channels are secured. The channels project forward from the front legs and rearwardly from the rear legs. For best results, the channels should be inclined upwardly and forwardly so that the machine can take advantage of the force of gravity while operating, as will be explained later.

Between the channels of the frame there are two vertical sprockets 7 and 8. One of these is journalled on a horizontal axis in the rear ends of the channels and the other one is similarly journalled in their upper or front ends. An endless conveyor chain 9 extends around the two sprockets. The upper sprocket is driven continuously by a chain and sprocket drive 10 from a gear reduction unit 11 driven by an electric motor 12 mounted on a stand 13 beside the machine frame.

Mounted on the conveyor chain at uniformly spaced intervals are brackets 15 that extend outwardly away from the chain in the plane of the sprockets. Secured to each of these brackets are the rear ends of a pair of laterally spaced pins 16 that extend forward parallel to the chain while the pins are in the area between the sprockets. These pins are for the purpose of loosely receiving metal sleeves 17 that are to be welded together as the pins carry them through the machine. The sleeves are slipped over the pins as the brackets travel around the rear or lower sprocket, because at that time the brackets are disposed at an angle to one another and therefore are farther apart than along the inclined sections of the chain. Also, as a bracket passes around the lower sprocket its pins extend rearwardly away from the sprocket so that their outer ends are readily accessible for receiving sleeves. Although the sleeves can be applied at this loading station by an attendant located there, it is preferred to feed the sleeves to the loading station automatically in such a manner that as each pair of pins travels around the lower sprocket they can enter a pair of sleeves and pick them up. Due to the inclination of the upper length of the chain, gravity will keep the lower ends of the sleeves against the adjoining brackets as they are carried forward toward the upper sprocket.

To feed the sleeves to the loading station, an inclined trough 20 may be provided, down which the sleeves can roll from a bin (not shown) or other source of supply for the sleeves located at one side of the machine. The lower end of the inclined trough is joined to one side of a horizontal plate 21 supported by the back legs of the frame and onto which the sleeves will roll. The opposite side of the plate is provided with a stop 22 that will arrest the leading sleeve in a position in which an oncoming pair of pins can enter the first two sleeves in the line. As these two sleeves are picked up by the pins and removed from the plate, the line of sleeves on the inclined trough will roll down far enough to replace the removed pair of sleeves with the next pair in line.

The upper length of the conveyor chain is supported by a plate 24 mounted on the inclined channels so that there will be no sag in the chain. Shortly after a pair of sleeves leave the loading station, they enter between a pair of upright strips 25 extending upwardly along the supporting plate to move the sleeves into more or less parallel relationship but not tight together. From the upper ends of these strips each pair of sleeves is carried between guide members that engage them and hold them close together while they are being welded together. The guide members may take various forms. Preferably, as best shown in FIGS. 2 and 4, one of the guide members is formed from a row of parallel rollers 26 journalled in a long housing 27 rigidly mounted on plate 24 at one side of the chain, so that the rollers will engage the advancing sleeves at that side of the conveyor chain and move them inwardly to position their inner sides substantially along the center line of the chain. By using concave rollers the position of the sleeves can be controlled better.

At the opposite side of the chain the guide member includes means for pressing against the sleeves at that side to hold them against the sleeves at the other side. One way of doing this is to mount a roller in such a manner that it can move toward and away from the row of rollers 26, and to urge it toward that row by means of a spring. Preferably, there are the same number of rollers at each side of the chain. The lowermost rollers 28 in the second row, which engage the sleeves first, hold the adjoining sleeves fairly close to the sleeves beside them, but at least the uppermost roller 29 is spring-pressed against the sleeves. This can be done by mounting the roller 29, and preferably roller 30 behind it, in a bracket 31 that is pivoted at its lower end on the axis of the upper fixed position roller 28 so that the upper end of the bracket can be swung toward and away from the opposite side of the machine. It is urged toward that side by a spring, which may be a coil spring 32 mounted in a cup 33 attached to the upper end of bracket 31. The spring is compressed by the head of a screw 34 adjustably mounted in the upper end of a bar 35 secured to the top of the adjoining front leg of the frame. Due to the spring pressure, the upper roller 29 will press each sleeve that engages it against the sleeve beside it. It is this area of the machine that forms the welding station.

The welding wire 37 is fed from a reel (not shown) and down through an inert gas nozzle 38 supported in any suitable manner above the two sleeves between the two upper rollers. Electric current is delivered to the welding wire periodically as it is fed downward intermittently to weld the central portions of the underlying sleeves together. The welding current and the wire feed are controlled by a circuit containing a normally open electric switch mounted on the machine frame. This switch is closed at regular intervals by means carried by the conveyor chain. Thus, for example, as shown in FIGS. 1 and 5, the switch 39 may be supported by a bar 40 welded to one of the front legs of the machine, with the outer end of the switch actuator 41 projecting into the path of the pin brackets. By mounting the switch in the correct position, a passing bracket will close it every time a pair of sleeves reaches the welding station. The welding current is cut off again before the sleeves leave the guide rollers and then, as the pins carrying the welding pair of sleeves travel down around the upper sprocket, the sleeves slide off the pins and drop into a suitable receptacle.

It is highly desirable to provide this machine with a safety feature that will prevent the welding apparatus from being operated in case one or both sleeves are missing from any given pair of pins traveling through the welding station. This can be accomplished by electrically connecting a second switch 43 (FIG. 4) in series with the first switch and operating it by the movement of the pivoted roller bracket 31. The safety switch is normally closed while the machine is operating and will remain that way as long as a pair of sleeves reach the welding station on every pair of pins. However, if one or both of the sleeves are missing from a pair of pins, due to the failure of the pins to pick up two sleeves at the loading station, the spring 32 will be able to swing the roller bracket farther inwardly than it otherwise could and this action will cause a lug 44 on the spring cup 33 to open the safety switch so that the welding apparatus cannot operate. The next pair of sleeves to arrive at the welding station will force the movable rollers outwardly and that will allow the safety switch to close again so that those two sleeves can be welded.

It will be seen that the machine disclosed herein can rapidly and uniformly weld metal sleeves side by side without requiring any manual labor. The cost of skilled welders is eliminated, as is the time required to position sleeves in a jig and then weld them by hand. The rate of production is increased greatly and the labor cost practically eliminated, so the cost of welding the sleeves together is greatly reduced.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A machine for welding metal sleeves together side by side in pairs, comprising a front sprocket and a rear sprocket rotatably mounted on parallel horizontal axes, an endless conveyor chain extending around the sprockets, means for driving one of the sprockets continuously to move the upper length of the chain forward toward the front sprocket, brackets attached to the chain at uniformly spaced intervals and extending outwardly away from the chain, a pair of laterally spaced pins secured at one end to each bracket and extending forward therefrom in a common plane substantially parallel to the chain while between the sprockets, each successive advancing pair of pins near the rear sprocket being adapted to loosely receive a pair of metal sleeves and carry them forward side by side, guide members mounted above the upper length of the chain for engaging passing sleeves on the pins and holding the sleeves in each successive pair close together, and means above the chain for electrically welding each pair of sleeves together as they pass said guide members.

2. A machine according to claim 1, in which said guide members include a roller for engagement by successive sleeves carried by the pins along one side of the chain, and means spaced across the chain from said roller for engaging successive sleeves at the other side of the chain and holding them against the sleeves beside them.

3. A machine according to claim 1, in which said guide members include a first row of parallel rollers for engagement by successive sleeves carried by the pins along one side of the chain, and a second row of parallel rollers spaced across the chain from the first row for engagement by the rest of the passing sleeves, at least one of the rollers in the second row being positioned to hold an adjoining sleeve against the one beside it.

4. A machine according to claim 1, in which said guide members include guiding means for engagement by successive sleeves carried by the pins along one side of the chain, and a roller spaced across the chain from said guiding means for engagement by the rest of the passing sleeves, said roller being movable laterally toward and away from said guiding means, and a spring urging the roller toward the guiding means.

5. A machine according to claim 1, in which said guide members include two spaced rows of rollers between which the sleeves are carried, at least one of the rollers in one of the rows being movable laterally toward the other row, and a spring urging said roller toward the other row to press a pair of sleeves between them together.

6. A machine according to claim 1, including means for feeding sleeves side by side to a position near the rear sprocket where each successive advancing pair of pins can enter them and pick up a pair.

7. A machine according to claim 1, including a normally closed switch for the welding circuit, and means operating to open the switch whenever a pair of pins arrive beneath the welding means without a pair of sleeves thereon.

8. A machine according to claim 4, including a normally closed switch for the welding circuit, and means movable with said movable roller for opening the switch whenever the roller is moved across the chain more than a predetermined distance, due to the absence of a pair of sleeves beneath the welding means.

9. A machine according to claim 1, including a normally open switch controlling the operation of the welding means, and means carried by the chain for closing the switch every time a pair of sleeves passes beneath the welding means.

10. A machine according to claim 7, including a normally open switch in series with said normally closed switch, and means spaced uniformly along the chain for closing the normally open switch every time a pair of sleeves passes beneath the welding means.

References Cited

UNITED STATES PATENTS

| | | | |
|---|---|---|---|
| 2,298,955 | 10/1942 | Mason | 269—56 X |
| 2,736,495 | 2/1956 | Calou. | |
| 2,845,038 | 7/1958 | Crawford | 228—49 |
| 3,056,883 | 10/1962 | Eisenburger et al. | 219—107 X |
| 3,127,503 | 3/1964 | Garner et al. | 219—124 |
| 3,200,936 | 8/1965 | Briggs | 198—178 |
| 3,338,380 | 8/1967 | Grebe | 198—189 |

FOREIGN PATENTS 721,186  5/1942  Germany.

JOSEPH V. TRUHE, Primary Examiner

L. A. SCHUTZMAN, Assistant Examiner

U.S. Cl. X.R.

219—79; 198—178; 228—6